L. C. JOSEPHS, Jr., AND G. WIRRER.
FURNACE FOR THE HEAT TREATMENT OF METALS.
APPLICATION FILED OCT. 9, 1920.

1,425,660.
Patented Aug. 15, 1922.
3 SHEETS—SHEET 1.

WITNESS

INVENTORS
BY
ATTORNEYS

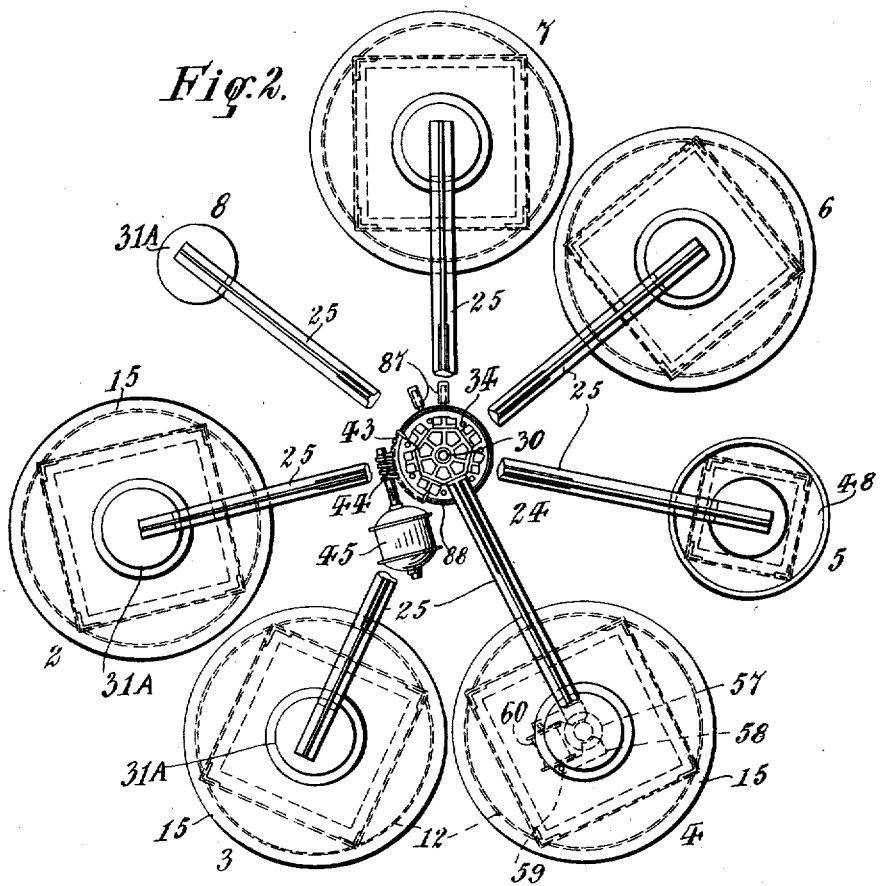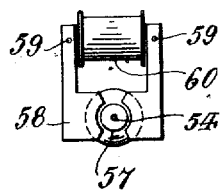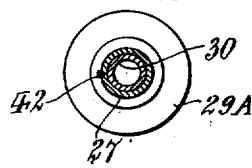

UNITED STATES PATENT OFFICE.

LYMAN C. JOSEPHS, JR., OF ALLENTOWN, PENNSYLVANIA, AND GOTTFRIED WIRRER, OF PLAINFIELD, NEW JERSEY, ASSIGNORS TO INTERNATIONAL MOTOR COMPANY, OF NEW YORK, N. Y., A CORPORATION OF DELAWARE.

FURNACE FOR THE HEAT TREATMENT OF METALS.

1,425,660.   Specification of Letters Patent.   Patented Aug. 15, 1922.

Application filed October 9, 1920. Serial No. 415,806.

*To all whom it may concern:*

Be it known that we, LYMAN C. JOSEPHS, Jr., and GOTTFRIED WIRRER, citizens, respectively, of the United States and the Swiss Republic, residing, respectively, in the city of Allentown, State of Pennsylvania, and in the city of Plainfield, State of New Jersey, have invented certain new and useful Improvements in Furnaces for the Heat Treatment of Metals, of which the following is a specification, reference being had to the accompanying drawings, forming a part hereof.

In another application for Letters Patent of the United States, made by the present applicants and pending concurrently herewith Ser. No. 415,804, filed October 9, 1920, there is shown and described a furnace for the heat treatment of metals which is designed with especial reference to the practise of certain improved methods of heat treatment of metals set forth in still other applications of the present applicants, wherein the determination of the critical point in the heat treatment of metal under consideration and the initiation of change in the heat treatment are effected through a change in the rate of change of dimension of the article under treatment. The initiating devices shown and described in the application first referred to are designed for use in the heat treatment of a metal which undergoes a slight contraction as it passes through the critical point and the furnace itself embodies suspended heating chambers, open at their lower ends and into which, in succession, the article under treatment is introduced through the open lower end, and the quenching tank is continuously charged with the quenching liquid. In general character the furnace to be described herein is substantially the same as the furnace just referred to, but in the present case the heating chambers are supported from below and are open at their upper ends to permit the introduction of the article under treatment, and the quenching liquid is introduced into the quenching tank after the article under treatment has been placed in position therein. The invention will be more fully explained hereinafter with reference to the accompanying drawings in which it is illustrated as embodied in a suitable structure and in which—

Figure 2 is a top view of the same with some parts in horizontal section and some parts broken away.

Figures 3 and 4 are detail views of parts to be referred to.

For convenience in reference, the same reference numerals will be used in the present case, as far as possible, as in the co-pending application previously mentioned, to indicate like parts.

Figure 1:
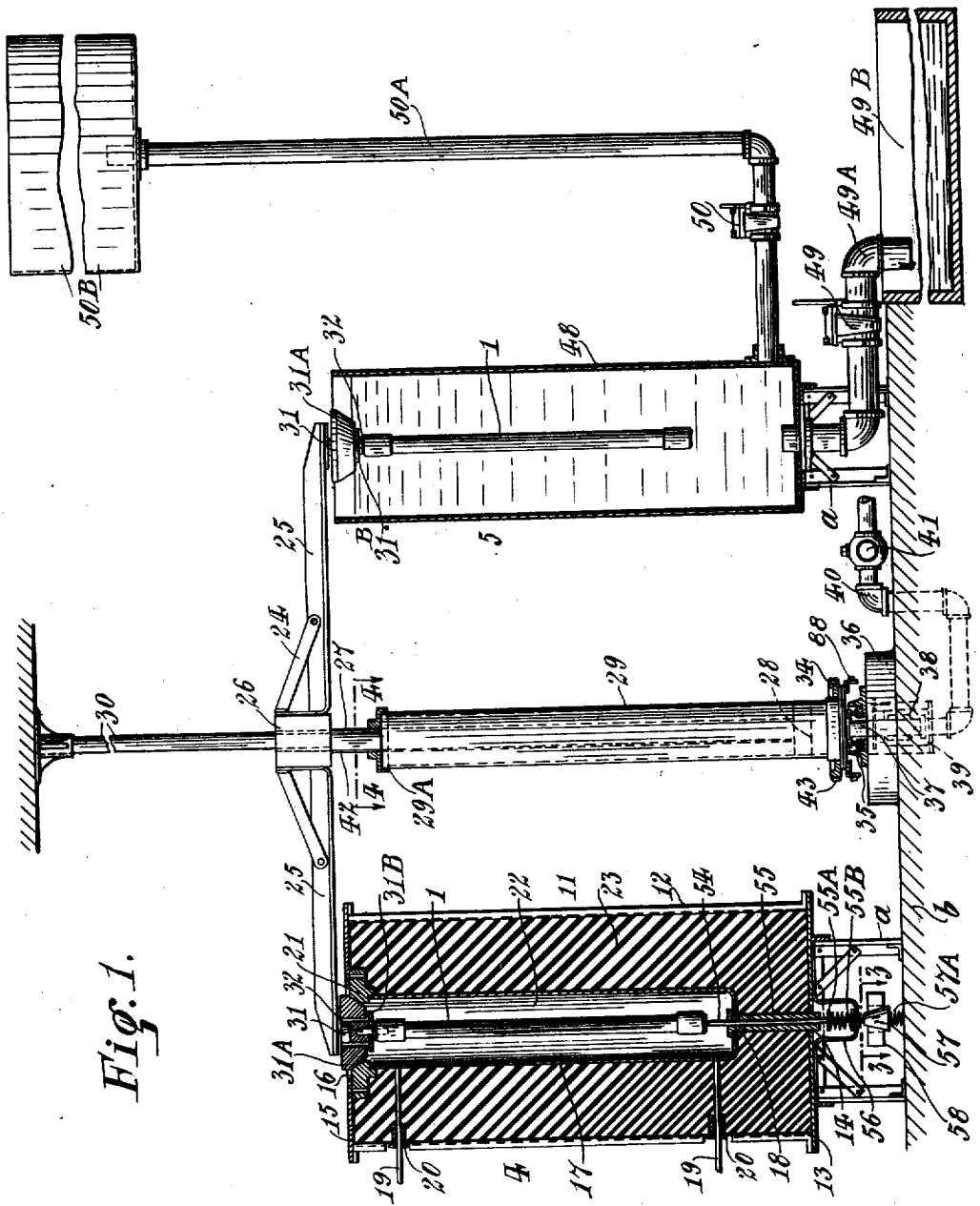
Figure 1 is a view partly in elevation and partly in vertical section of a furnace constructed in accordance with the invention.

The article represented in the drawings as undergoing heat treatment is shown as a shaft, having a length many times greater than its diameter, and the furnace is constructed with reference to the treatment of such articles, but it will be understood, especially as this description proceeds, that other articles can be treated in the same furnace or that the parts of the furnace can be modified in proportion and design to suit articles of other shape.

The charging station, heating chambers and drawing chamber are supported on suitable frames $a$, erected upon the foundation $b$, and are arranged about a common center. In the furnace illustrated provision is made for three heating stations 2, 3 and 4, of graduated temperatures, one quenching station 5, two drawing stations 6 and 7, also of graduated temperatures, and a single station 8 for charging and unloading. The several heating chambers and drawing chambers are identical in construction, except that the automatic controlling devices are incorporated with the heating station 4 only, and a description and detailed illustration of one will suffice for all.

Each furnace 11, supported by the frame $a$ on the foundation $b$, comprises, in the construction shown, a cylindrical shell 12, closed at its bottom by a plate 13 which has at its center a relatively small hole 14, and at its top by a plate 15, which has at its center a relatively larger hole 16. Centrally disposed within the shell 12 is a preferably cylindrical, electrically resistant heating element, which has at its bottom a relatively small hole 18, in line with the hole 14 of the plate 13, and is open at its upper end. Conductors 19, from a transformer or other suitable source of current supply, are extended through insulating bushings 20 in the shell 12 and are connected to the heating element or resistor 17 near its upper and lower end. At its upper end the heating element supports a suitable heat resisting and electrically insulating cap 21 which has a circular opening in registration with the opening 16 of the plate 15, but smaller in diameter. The space 22 within the resistor constitutes the heating chamber, or the drawing chamber, as the case may be, and the space between the resistor 17 and shell 12 is filled with heat insulating material, indicated at 23, such filling serving to retain the resistor in position without securing devices.

Above the heating and drawing chambers, and mounted for up and down movement as well as rotary movement, is a seven-armed spider or carrier or conveyor 24, each arm 25 of which is secured to a hub 26 which is carried by a vertical, preferably hollow, plunger rod 27. The latter is itself carried by a plunger 28, in a rotatable cylinder 29, to which a liquid under pressure is admitted from a suitable source, not shown, and is permitted to escape for the purpose of raising or lowering the carrier or conveyor 24, which is preferably guided in its movements by a rod 30 which depends from the roof or floor above and enters the tubular plunger rod 27.

At the outer end of each arm 25 is a fixture 31, preferably of nickel-chrome alloy or other heat resisting material, from which the shaft 1 or other article to be treated is suspended, being connected thereto by any convenient means such as a stud 32 which is secured in the fixture 31 and can have the article under treatment detachably secured to it. An annular plug 31^A, surrounding the fixture 31 and supported, when the conveyor is raised, by a disc 31^B secured to the fixture or to the stud 32, is fitted to the opening in the annular cap 21 and serves to close the furnace at its upper end when the article under treatment is in place therein.

It will be understood that in the operation of the furnace each article to be treated is presented by the carrier or conveyor above the respective heating chamber or drawing chamber or quenching tank, as the case may be, in axial alignment therewith, and is then lowered into such chamber or tank, is permitted to remain there during the required space of time, and is then raised out of the chamber or tank and transferred to position above the next chamber or tank, as the case may be.

To provide for the movement of the conveyor, in the construction shown, the cylinder 29 is mounted on a turntable 34 and is supported from a suitable foundation 36 by a ball thrust bearing 35. A pipe 37 is extended downward from the cylinder 29 through the bearing 35 and foundation 36, into a stuffing box 38 in which it is free to rotate. The lower member 39 of the stuffing box is connected by a pipe 40 and a three-way controlling valve 41 to a source of supply of liquid under pressure, not shown, and to a discharge, so that, when the valve 41 is moved to admit liquid to the cylinder, the carrier or conveyor will be raised and when the liquid is permitted to escape from the cylinder, the carrier or conveyor will be lowered. The plunger rod 27 is provided with a key 42 to enter a key way in the cap 29^A of the cylinders 29, so that the carrier or conveyor is compelled to rotate with the turntable 34. To the latter is secured a worm gear 43 engaged by a worm 44, driven by a suiable electric motor 45, the operation of which is controlled automatically as hereinafter described.

For the quenching of the article to be treated, after it has attained its final temperature in the third heating station 4, there is provided an oil or water tank 48, which, in the present instance, is fixed in position. As the article under treatment remains in position within the quenching tank 48 for the same length of time that it remains in position in each heating chamber, and as submersion of the article in the quenching liquid for such length of time might result in too much reduction of the temperature of the article, provision is made for the draining of the quenching tank after each quenching, so that the next article shall be introduced into the quenching tank when the tank is empty, and for refilling the quenching tank at the proper time, so that the submersion of the article in the quenching liquid shall continue for only such period of time as is desirable. For this purpose the tank 48 can be drained, under control of a valve 49, through a pipe 49^A into a sump 49^B, and can be refilled, under control of a valve 50, through a pipe 50^A from a suitable source of supply, such as an elevated tank 50^B to which the quenching liquid can be returned from the sump 49^B by a suitable pump not shown.

The devices for initiating a change in the heat treatment, as by transfer of the article under treatment from one heating chamber to another or to the quenching tank, or from the quenching tank to a drawing chamber, being designed, in the present instance, for a metal which, in passing through its critical point, contracts, the change in the rate of change of dimension being from the positive to the negative, are substantially the same as the initiating devices described in the application referred to, only such changes being made as are necessary to adapt them to the change in position of the heating chamber with which they co-operate. In the present instance such heating chamber is the one located at the heating station 4. In the heating chamber 22 of this station the article 1 under treatment bears at its lower end upon a pin 54 which passes freely through an insulating bushing 55, is shouldered as at 55<sup>A</sup>, and is supported by a spring 55<sup>B</sup>, which in turn is supported by a fixed bracket 56. At its lower end, during normal expansion of the article under treatment, the pin 54 is in electrical contact with a tapered block 57 which is pressed upwardly by a spring 57<sup>A</sup> and is received between and prevented from upward movement by jaws 58, hinged at 59 and forming the pole pieces of an electromagnet 60. As the article under treatment elongates it presses the block 57 downward against the spring 57<sup>A</sup> and the block is held in its depressed position by the jaws 58 (the magnet 60 being then energized) so that when the article under treatment contracts, as when it passes through the critical point, the pin 54 is raised by the spring 55<sup>B</sup> and is separated or moved out of electrical contact with the tapered block 57. The pin 54 and block 57 constitute terminals of the initiating electric circuit, which is thus broken as the article under treatment passes through its critical point.

Figure 5:
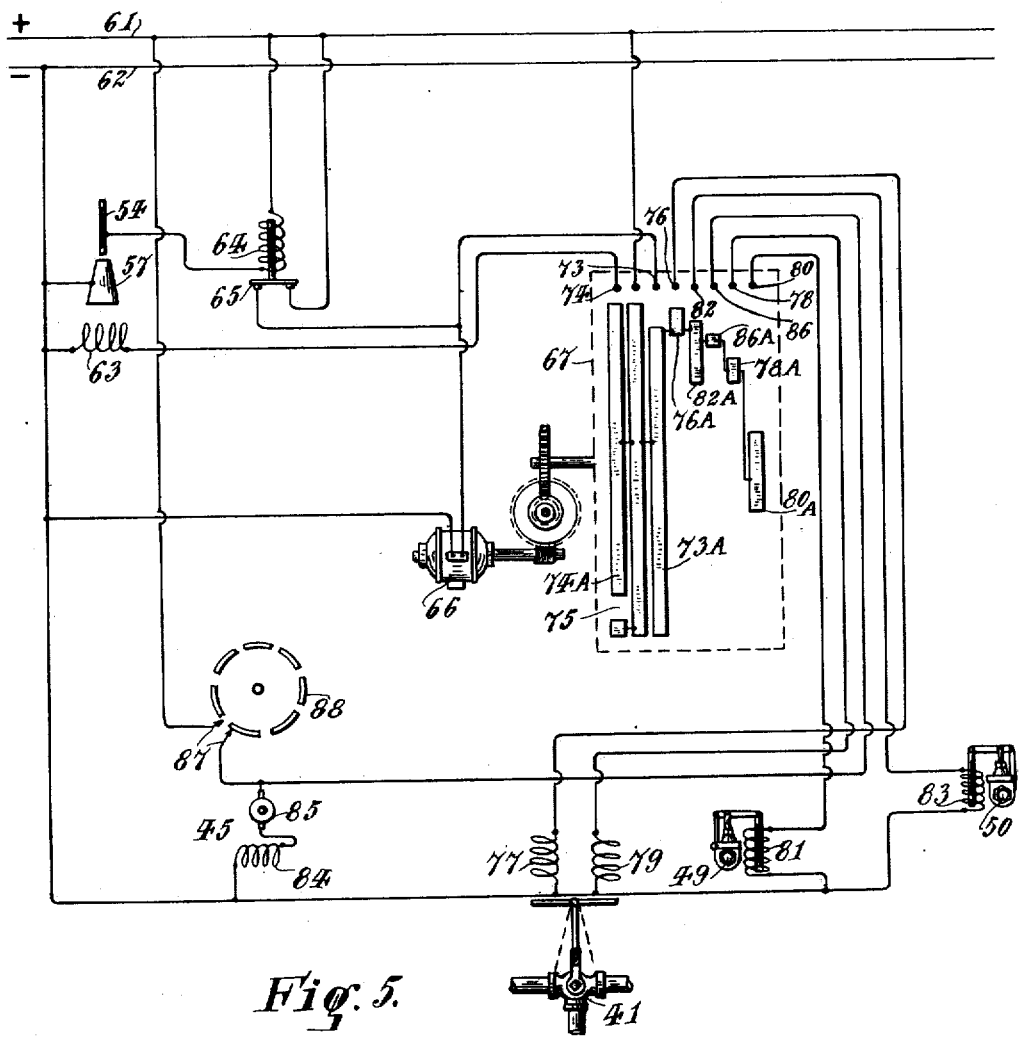
Figure 5 is a diagrammatic representation of the electrically operated controlling devices and their connections.

Referring now more particularly to Figure 5, in which the electrical devices and their connections are illustrated diagrammatically and in which the main supply wires are indicated at 61 and 62, it will be seen that the winding of the electromagnet 60, which controls the clutch for the circuit breaking device already described, is indicated at 63, while the coil of a circuit closer 65 is indicated at 64, the same being connected into the main circuit through the pin 54 and the block 57 above described. So long as the pin and block are in contact, the circuit closer 65, (which may be of any usual or suitable construction) is held open, but when the initiating circuit is broken at 54, 57, then the circuit is closed through the circuit closer 65 and through the windings of a controller motor 66 which, through suitable gearing, drives a controller drum 67, the contacts of which are indicated diagrammatically and in development. Through terminal 73, in co-operation with the contact 73<sup>A</sup> of the controller drum, the circuit through the coils of the control motor 66 is maintained, after the control motor has once been started, through a complete rotation of the controller drum, regardless of other circuits, the advancement of the carrier or conveyor 24 through one step, or one-seventh of three hundred and sixty degrees, that is, the transfer of an article under treatment from one station to the next, being accomplished through one complete rotation of the controller drum.

Through terminal 74 and contact 74<sup>A</sup> of the drum, the coil 63 of the magnet 60 is energized to hold the block 57 in the position to which it was pushed by the pin 54. A gap 75 in the contact 74<sup>A</sup> breaks the circuit through the coil 63 momentarily, so as to permit the magnet 60 to be de-energized and the block 57 to be freed so that it can be pushed upward by its spring 57<sup>A</sup> for the purpose of restoring the circuit in readiness for the next movement of the carrier.

Through terminal 76 and contact 76<sup>A</sup> of the drum, circuit is closed through an electromagnetic device indicated at 77 which operates the valve 41 to admit liquid to the cylinder 29 for the purpose of raising the carrier 24. Similarly terminal 78 co-operates with the corresponding contact 78<sup>A</sup> of the drum to close the circuit through the electromagnetic device indicated at 79 which actuates the valve 41 so as to permit the escape of the liquid from the cylinder 29 and the carrier 24 to be lowered.

Terminal 80, in co-operation with the corresponding contact 80<sup>A</sup> of the drum, closes the circuit through the electromagnetic device indicated at 81 to open the valve 49 for the purpose of emptying the quenching tank, the valve being closed by any suitable means, such, for example, as the weight of the connected parts, while the terminal 82, in co-operation with the contact 82<sup>A</sup> of the drum, closes the circuit through the electromagnetic device indicated at 83 for the purpose of opening the valve 50 to permit the quenching tank to be filled.

Through terminal 86 and the contact 86<sup>A</sup> of the drum circuit is closed for a short time through the field coils 84 and armature coils 85 of the motor 45 by which the cylinder 29 and the carrier 24 are rotated. After the motor has been started sufficiently to bring one segment of the segmental contact strip 88, carried with the cylinder 29, into contact with both of the two brushes indicated at 87, operation of the motor and rotation of the shaft and carrier are continued until this direct motor circuit is broken by the next succeeding gap in the segmental contact strip, when the operation of the motor and rotary movement of the carrier cease to permit the article under treatment to be lowered into the corresponding chamber or tank by the descent of the carrier.

When the article has remained in the chamber for the required length of time the circuit is closed through the coil 77 to cause the carried to be raised and the article raised from the chamber and then the circuit is closed through terminal 86 and the coils of the motor to cause the rotary movement of the carrier to be commenced again, this movement being conducted by the closing of the circuit through the brushes 87 as already described.

The operation of the furnace, which has been explained in detail as to its several devices, may now be described in general as follows.

The operation is manually controlled until the first article placed on the carrier at the charging station 8 has reached the heating station 4 and thereafter the control is automatic, each movement being initiated, as described, through the change in the rate of change of dimension of the article under treatment, that is, in the present case, through the contraction of such article, or change from a positive increase to a negative increase when the article passes through the critical point. When this takes place the controlling motor is brought into operation to rotate the controller drum and the first effect is to admit liquid to the cylinder 29 to cause the carrier to be raised and all of the articles to be raised with it, the valve 49 having been opened, in the previous station, to permit the quenching tank to be emptied and be closed. As soon as the carrier has reached its proper height, the motor 45 is actuated and the carrier is thereby advanced one step, each article being transferred from one station to the next, when the valve 41 is operated to permit the liquid to escape from the cylinder 29 and the carrier to descend. At the proper time after the carrier has reached its lowest position the valve 50 is opened to admit the quenching liquid to the quenching tank 48. In like manner the successive operations are initiated and carried on and each article which has been placed on the carrier is transferred from one station to another, undergoing the desired heat treatment at each station, and is finally presented for unloading at the station 8 where its place on the carrier is immediately filled by another article to be treated.

It will be understood that various changes in details of construction and arrangement can be made to suit different conditions of use and that the invention, except as pointed out in the claims, is not limited to the particular construction shown and described herein.

We claim as our invention:

1. In a furnace for the heat treatment of metal, the combination of a series of heat treating stations, a carrier movable to transfer the article under treatment from one station to the next, a motor for operating the carrier, electrical connections through which the motor is operated intermittingly and devices subject to a change in the rate of change of dimension of the article under treatment whereby the operation of the motor is initiated after each period of rest.

2. In a furnace for the heat treatment of metal, the combination of a series of heat treating stations, a carrier movable to transfer the article under treatment from one station to the next, a motor for operating the carrier, electrical connections through which the motor is operated intermittingly, and electromagnetic devices to initiate the operation of said motor after each period of rest and including circuit controlling devices subject to a change in the rate of change of dimension of the article under treatment.

3. In a furnace for the heat treatment of metal, the combination of a series of heat treating stations, a carrier movable to transfer the article under treatment from one station to the next, a motor for operating the carrier, electrical connections through which the motor is operated intermittingly, a slidable pin adapted to bear against the article and to be moved thereby as it expands, a block movable by the pin in one direction, means to prevent movement of the block in the opposite direction, and electromagnetic devices actuated by the separation of the pin and block to initiate the operation of said motor after each period of rest.

4. In a furnace for the heat treatment of metal, the combination of a heating chamber, means to suspend therein the article under treatment, a slidable pin, means to press the same yieldingly upward against the article, a spring supported block movable downward by the pin, means to prevent movement of the block upward, an electric circuit including said pin and block and an electromagnetic device and broken by the separation of the pin and block, and devices for effecting a change in the heat treatment, the operation of which is initiated by said electromagnetic device.

5. In a furnace for the heat treatment of metal, the combination of a series of heat treating stations arranged about a common center, a carrier arranged to rotate about the same center, a motor and operative connections for effecting rotary movement of the carrier, electrical connections to effect an intermittent operation of the motor, and devices subject to a change in the rate of change of dimensions of the article under treatment, whereby the operation of the motor is initiated after each period of rest.

6. In a furnace for the heat treatment of metal, the combination of a series of heat treating stations arranged about a common center, a carrier arranged to rotate about the same center, a motor and operative connections for effecting rotary movement of the carrier, electrical connections to effect an intermittent operation of the motor, and electromagnetic devices to initiate the operation of the motor after each period of rest and subject to a change in the rate of change of dimension of the article under treatment.

7. In a furnace for the heat treatment of metal, the combination of a series of heat treating stations arranged about a common center, a carrier mounted to rotate about the same center and to have an up and down movement, a cylinder and plunger to effect the up and down movement of the carrier, the cylinder and the carrier being connected to rotate together, a motor and intermediate connections for rotating the cylinder and devices whereby an intermittent operation of the motor is effected.

8. In a furnace for the heat treatment of metal, the combination of a series of heat treating stations arranged about a common center, a carrier mounted to rotate about the same center and to have an up and down movement, a cylinder and plunger to effect the up and down movement of the carrier, the cylinder and the carrier being connected to rotate together, a motor and intermediate connections for rotating the cylinder, a segmental contact strip carried with the cylinder, electrical connections through said contact strip to the motor whereby intermittent operation of the motor is effected, and other connections to the motor whereby the operation of the motor is resumed after each period of rest.

9. In a furnace for the heat treatment of metal, the combination of a series of heat treating stations, including a heating chamber and a quenching tank, a carrier and means to move the same intermittingly to transfer the article under treatment from one station to the next and means whereby the quenching tank is emptied and refilled at each operation.

10. In a furnace for the heat treatment of metal, the combination of a series of heat treating stations, including a quenching tank, arranged about a common center, a carrier mounted to rotate about the same center, and movable to introduce the articles carried by it into and remove them from the respective heat treating stations, means to impart to the carrier an intermittent rotary motion with a period of rest between successive movements and means to cause the quenching tank to be emptied and refilled with the quenching liquid at each successive operation.

This specification signed this 3d day of Sept. A. D. 1920.

LYMAN C. JOSEPHS, Jr.
GOTTFRIED WIRRER.